United States Patent
Al-Shyoukh et al.

(10) Patent No.: US 10,833,535 B2
(45) Date of Patent: Nov. 10, 2020

(54) POWER RESONATOR WITH WIDE INPUT VOLTAGE RANGE FOR ISOLATED POWER TRANSFER

(71) Applicant: Silicon Laboratories Inc., Austin, TX (US)

(72) Inventors: Mohammad Al-Shyoukh, Cedar Park, TX (US); Krishna Pentakota, Austin, TX (US); Stefan N. Mastovich, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 183 days.

(21) Appl. No.: 16/141,052

(22) Filed: Sep. 25, 2018

(65) Prior Publication Data

US 2020/0099255 A1    Mar. 26, 2020

(51) Int. Cl.
  *H02J 50/12*    (2016.01)
  *H02M 3/338*   (2006.01)
  *H02M 3/335*   (2006.01)
  *H02M 3/337*   (2006.01)

(52) U.S. Cl.
  CPC ............ *H02J 50/12* (2016.02); *H02M 3/338* (2013.01); *H02M 3/3374* (2013.01); *H02M 3/33523* (2013.01)

(58) Field of Classification Search
  CPC ........... H02M 3/33523; H02M 3/3374; H02M 3/338; H02J 50/12
  USPC ....................................................... 307/104
  See application file for complete search history.

(56) References Cited

U.S. PATENT DOCUMENTS

| | | |
|---|---|---|
| 7,489,526 B2 | 2/2009 | Chen et al. |
| 7,679,162 B2 | 3/2010 | Dupuis et al. |
| 7,706,154 B2 | 4/2010 | Chen et al. |
| 8,861,229 B2 | 10/2014 | Alfano et al. |
| 8,878,560 B2 | 11/2014 | Kuo et al. |
| 9,035,422 B2 | 5/2015 | Khanolkar et al. |
| 9,367,072 B2 | 6/2016 | Al-Shyoukh et al. |
| 9,425,682 B2 | 8/2016 | Al-Shyoukh et al. |
| 9,537,581 B2 | 1/2017 | Mills et al. |
| 9,698,654 B2 | 7/2017 | Santos et al. |
| 9,812,989 B1 | 7/2017 | Dupuis et al. |
| 10,511,273 B2 | 12/2019 | Al-Shyoukh |

(Continued)

OTHER PUBLICATIONS

Analog Devices, Inc., "Dual-Channel, 2.5 kV Isolators with Integrated DC-to-DC Converter," Data Sheet ADuM5200/ADuM5201/ADuM5202, 2009-2012, 28 pages.

(Continued)

*Primary Examiner* — Michael R. Fin
(74) *Attorney, Agent, or Firm* — Zagorin Cave LLP (57) ABSTRACT

A power transfer device includes a first power supply node, a second power supply node, and an oscillator circuit configured to convert an input DC signal across the first power supply node and the second power supply node into an AC signal on a differential pair of nodes comprising a first node and a second node in response to a control signal. The oscillator circuit includes a regulated power supply node and an active shunt regulator circuit configured to clamp a peak voltage level across the regulated power supply node and the second power supply node to a clamped voltage level. The clamped voltage level is linearly related to a first voltage level on the first power supply node.

20 Claims, 6 Drawing Sheets

(56) References Cited

U.S. PATENT DOCUMENTS

| | | |
|---|---|---|
| 2002/0150151 A1 | 10/2002 | Krone et al. |
| 2003/0091140 A1 | 5/2003 | Dupuis et al. |
| 2004/0057524 A1 | 3/2004 | Krone et al. |
| 2004/0190670 A1 | 9/2004 | Dupuis et al. |
| 2005/0100104 A1 | 5/2005 | Dupuis et al. |
| 2006/0049881 A1 | 3/2006 | Rein |
| 2007/0075813 A1 | 4/2007 | Zhang |
| 2007/0080360 A1 | 4/2007 | Mirsky |
| 2007/0139032 A1 | 6/2007 | Dupuis et al. |
| 2007/0246805 A1 | 10/2007 | Zhang et al. |
| 2008/0013635 A1 | 1/2008 | Dupuis |
| 2008/0025450 A1 | 1/2008 | Alfano et al. |
| 2008/0031286 A1 | 2/2008 | Alfano et al. |
| 2008/0119142 A1 | 5/2008 | Dupuis |
| 2008/0164955 A1 | 7/2008 | Pfeiffer |
| 2008/0192509 A1 | 8/2008 | Dhuyvetter |
| 2008/0260050 A1 | 10/2008 | Dupuis |
| 2008/0267301 A1 | 10/2008 | Alfano et al. |
| 2009/0017773 A1 | 1/2009 | Dupuis et al. |
| 2010/0052826 A1 | 3/2010 | Callahan et al. |
| 2010/0118918 A1 | 5/2010 | Dupuis |
| 2014/0126254 A1* | 5/2014 | Al-Shyoukh ........... G05F 1/468 363/49 |
| 2014/0153296 A1 | 6/2014 | Pan |
| 2014/0177290 A1 | 6/2014 | Zhang |
| 2014/0375138 A1 | 12/2014 | Sako |
| 2015/0145446 A1 | 5/2015 | Shitabo |
| 2015/0171901 A1 | 6/2015 | Dupuis et al. |
| 2016/0036340 A1 | 2/2016 | Kikuchi |
| 2017/0346406 A1 | 11/2017 | Bucheru |
| 2018/0278229 A1 | 9/2018 | Sankaran et al. |
| 2019/0068071 A1* | 2/2019 | Jia ........................... H02M 1/14 |
| 2019/0305608 A1* | 10/2019 | Pentakota ............... H02M 1/44 |

OTHER PUBLICATIONS

Analog Devices, Inc., "Hot Swappable, Dual 12C Isolators with Integrated DC-to-DC Converter," Data Sheet ADM3260, 2013-2016, 19 pages.

Analog Devices, Inc., "Quad-Channel, 5 kV Isolators with Integrated DC-to-DC Converter," Data Sheet ADuM6400/ADuM6401/ADuM6402/ADuM6403/ADuM6404, 2009-2012, 28 pages.

Fanori, L. and Andreani, P., "Class-D CMOS Oscillators," IEEE Journal of Solid-State Circuits, vol. 48, No. 12, Dec. 2013, pp. 3105-3119.

Silicon Laboratories, "1MBPS, 2.5KVRMS Digital Isolators," Si86xx, 2015, 52 pages.

Silicon Laboratories, "5 KV LED Emulator Input, Open Collector Output Isolators," Si87xx, 2014, 39 pages.

Silicon Laboratories, "Dual Digital Isolators with DC-DC Converter," Si88x2x, Jul. 2015, 45 pages.

Tsai, C.T., and Chou, H.P., "A Synthetic Ripple Buck Converter with Dynamic Hysteretic Band Modulation," International Conference on Power Electronics and Drive Systems, PEDS 2009, pp. 170-174.

\* cited by examiner

POWER RESONATOR WITH WIDE INPUT VOLTAGE RANGE FOR ISOLATED POWER TRANSFER

BACKGROUND

Field of the Invention

This invention relates to isolation technology and more particularly to providing power across an electrical isolation barrier.

Description of the Related Art

Figure 1:
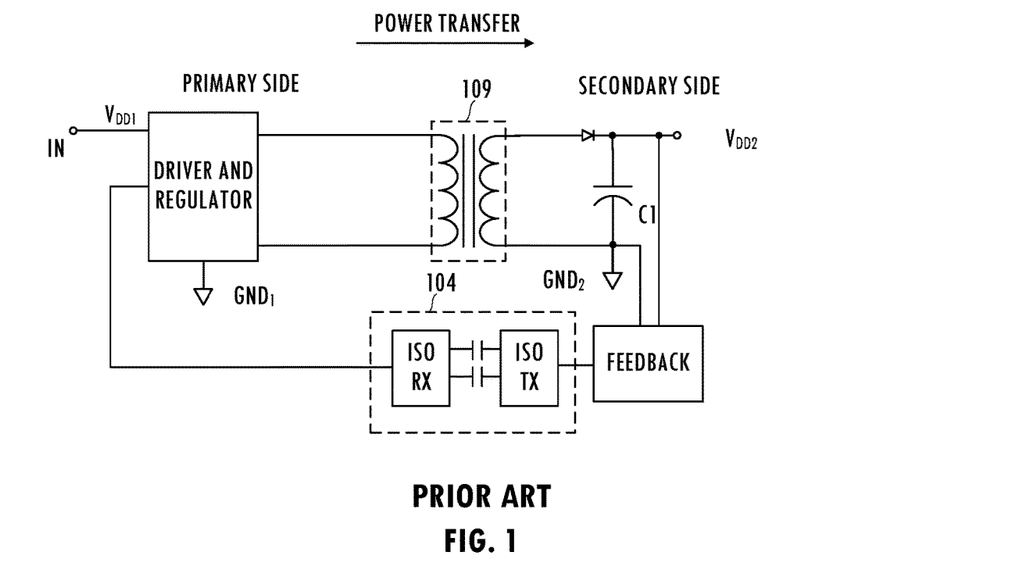
FIG. 1 illustrates a functional block diagram of a conventional circuit for transferring power across an electrical isolation barrier using feedback to regulate the output signal.

A typical isolated power transfer system transfers power across an electrical isolation barrier that electrically isolates a first voltage domain from a second voltage domain. Referring to FIG. 1, a conventional high-power system (e.g., a system having a power level greater than approximately 1 W) uses a power converter including standard transformer 109, e.g., a discrete transformer with a ferrite core and high efficiency to transfer power across the electrical isolation barrier. Depending on the complexity of the drive circuitry, the conventional high-power system may achieve power transfer efficiencies of approximately 70% to approximately 95%. In order to regulate output voltage $V_{DD2}$, communications channel 104 provides any necessary feedback signals across the electrical isolation barrier. Although the standard transformer implementation is efficient, the size and cost of the standard transformer implementation may be prohibitive for use in some applications. Thus, low-cost, isolated power transfer systems having power transfer efficiency sufficient for a target application are desired.

SUMMARY OF EMBODIMENTS OF THE INVENTION

In at least one embodiment, a power transfer device includes a first power supply node, a second power supply node, and an oscillator circuit configured to convert an input DC signal across the first power supply node and the second power supply node into an AC signal on a differential pair of nodes comprising a first node and a second node in response to a control signal. The oscillator circuit includes a regulated power supply node and an active shunt regulator circuit configured to clamp a peak voltage level across the regulated power supply node and the second power supply node to a clamped voltage level. The clamped voltage level is linearly related to a first voltage level on the first power supply node.

In at least one embodiment, a method includes converting an input DC signal received using a first power supply node and a second power supply node into an AC signal. The converting includes clamping a voltage level across a regulated power supply node and the second power supply node to a clamped voltage level. The clamped voltage level is linearly related to a first voltage level of the input DC signal. In at least one embodiment of the method, the converting further includes developing a pseudo-differential signal on a differential pair of nodes including a first node of the oscillator circuit and a second node of the oscillator circuit. In at least one embodiment of the method, the clamping limits a peak voltage level of the AC signal to the clamped voltage level.

In at least one embodiment, a power transfer device includes a first power supply node, a second power supply node, and a power amplifier. The power amplifier includes a regulated power supply node, an oscillator including a differential pair of nodes including a first node and a second node, first transistors having a first conductivity type and a first breakdown voltage coupled to the first node and the second node, and second transistors having the first conductivity type and a second breakdown voltage. The second transistors are coupled to the first transistors. The power amplifier includes an active shunt regulator circuit configured to clamp a peak voltage level across the regulated power supply node and the second power supply node to a clamped voltage level. The clamped voltage level is linearly related to a first voltage level across the first power supply node and the second power supply node. The active shunt regulator circuit includes a first transistor having the first conductivity type and the first breakdown voltage. The first transistor is coupled to the regulated power supply node and the first power supply node. The active shunt regulator circuit includes at least one second transistor having the second breakdown voltage. The at least one second transistor is coupled between the first power supply node and the second power supply node. The first breakdown voltage is greater than the second breakdown voltage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A low-cost, power transfer device includes a transformer within an integrated circuit package. A primary winding of the transformer is coupled to a first integrated circuit to form a DC/AC power converter and a secondary winding of the transformer is coupled to a second integrated circuit to form an AC/DC power converter. The first and second integrated circuits are electrically isolated from each other, i.e., no current flows between the first integrated circuit and the second integrated circuit and several thousand volts can separate ground voltage levels on power supply node $GND_1$ and power supply node $GND_2$ of the first integrated circuit and the second integrated circuit, respectively.

Figure 2:
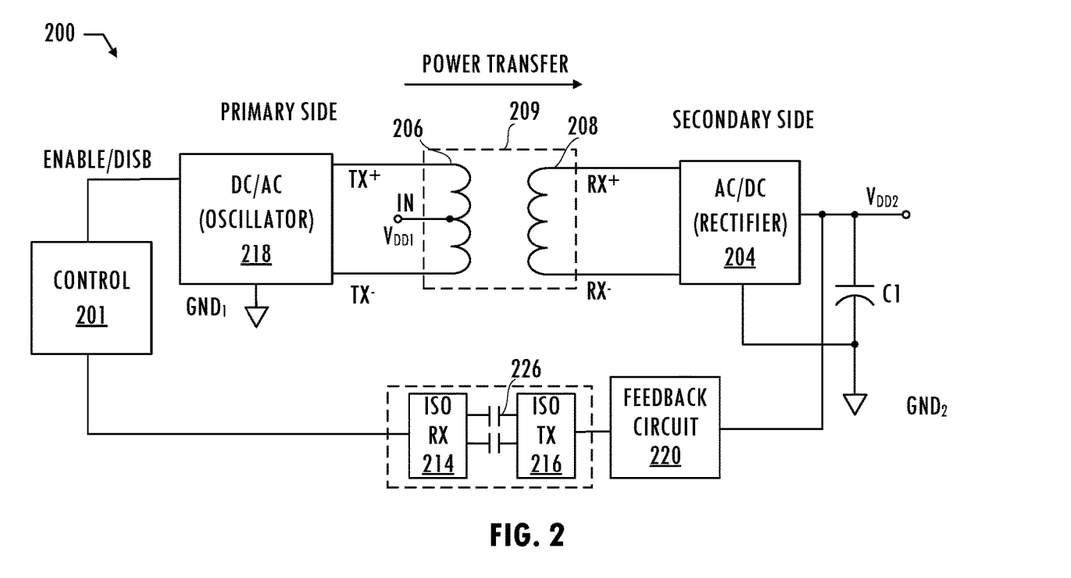
FIG. 2 illustrates a functional block diagram of a system for transferring power across an electrical isolation barrier using feedback to regulate the output signal.

Referring to FIG. 2, power transfer device 200 includes a DC/AC converter implemented using oscillator circuit 218 coupled to conductive coil 206. The DC/AC converter uses input DC signal $V_{DD1}$ (i.e., the input DC voltage across power supply node $V_{DD1}$ and power supply node $GND_1$) to bias conductive coil 206 of transformer 209. Power transfer device 200 includes AC/DC power converter circuit 204, which uses conductive coil 208 of transformer 209 to drive capacitor C1. In at least one embodiment, a primary-side power converter stage includes conductive coil 206 and oscillator circuit 218 configured to operate as a Class-D power amplifier. This primary-side power converter stage may be tuned to oscillate with a particular frequency (e.g., approximately 60 MHz-400 MHz) using variable capacitors.

Oscillator circuit 218 converts input DC signal $V_{DD1}$ to an AC signal (e.g., the pseudo-differential signal on differential pair of nodes TX+ and TX−). Transformer 209 converts that AC signal into a second AC signal (e.g., the pseudo-differential signal on differential pair of nodes RX+ and RX−). AC/DC power converter circuit 204 receives the second AC signal from conductive coil 208 and converts the second AC signal into output DC signal $V_{DD2}$ that is electrically isolated from input DC signal $V_{DD1}$. AC/DC power converter circuit 204 includes a full-wave rectifier circuit.

Power transfer device 200 regulates output DC signal $V_{DD2}$ by enabling and disabling oscillator circuit 218 using a control signal generated by control circuit 201 based on feedback information received from feedback circuit 220 via capacitive channel 226, which communicatively couples electrically isolated integrated circuits. Capacitive channel 226 communicates the feedback information across the electrical isolation barrier from the secondary side to the primary side of power transfer device 200. The feedback may be provided as a digital signal communicated across the electrical isolation barrier using transmitter 216 and receiver 214 that implements digital modulation of the information transmitted across the capacitive channel 226.

Figure 3:
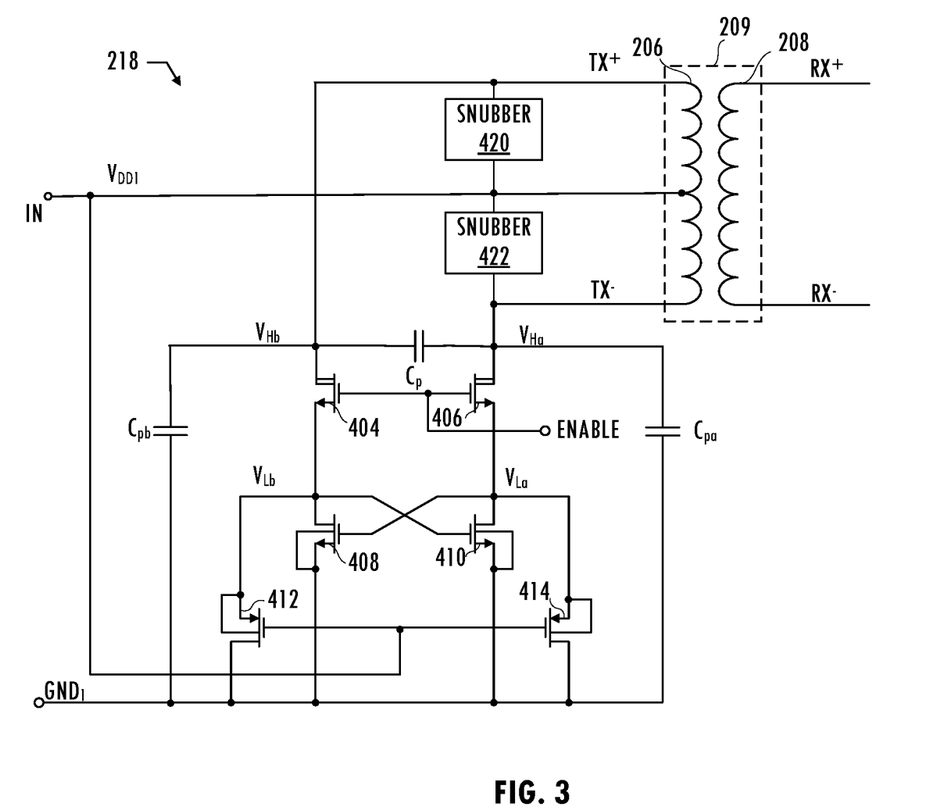
FIG. 3 illustrates a circuit diagram of an exemplary oscillator circuit of a power transfer device compatible with an application having a narrow input voltage range.

Referring to FIG. 3, in at least one embodiment, oscillator circuit 218 includes a latch circuit formed by latch transistor 408 and latch transistor 410, which are n-type transistors cross-coupled to each other and coupled to cascode transistor 404 and cascode transistor 406, which are also n-type transistors. Latch transistor 408 and latch transistor 410 are on the primary side of the power transfer device and are configured to pump energy into the LC tank circuit of oscillator circuit 218 at a frequency that is determined by passive system elements. Conductive coil 206 (i.e., the primary-side winding of transformer 209) can experience voltages as high as $3.2 \times V_{DD1}$ due to the Class-D mode operation (e.g., the pseudo-differential signal on nodes $V_{Ha}$ and $V_{Hb}$ having voltage levels in a range between $2.9 \times V_{DD1}$ and $3.2 \times V_{DD1}$) of oscillator circuit 218. Oscillator circuit 218 is selectively enabled via cascode transistor 404 and cascode transistor 406, which selectively cut off the current path to transformer 209 according to control signal ENABLE.

Clamp transistor 412 and clamp transistor 414 limit the gate-to-source voltages of latch transistor 408 and latch transistor 410, respectively, to a maximum of approximately $V_{DD1}+|V_{tp}|$. Clamp transistor 412 and clamp transistor 414 are p-type transistors configured to suppress any substantial coupling across the drain-to-source parasitic overlap capacitance of cascode transistor 404 and cascode transistor 406, respectively, if cascode transistor 404 and cascode transistor 406 try to lift the gate-to-source voltages of latch transistor 408 and latch transistor 410, respectively, above $V_{DD1}+|V_{tp}|$. For an exemplary 5 V CMOS process, $V_{DD1}$ is 5 V and $|V_{tp}|$ is approximately 1 V, and the clamping occurs at approximately 6 V, which is close to the maximum gate-to-source voltage that a conventional 5 V transistor can withstand.

As discussed above, the primary-side DC/AC converter including conductive coil 206 and oscillator circuit 218 operates as a high-efficiency Class-D power amplifier. The Class-D operation of oscillator circuit 218 reduces transition times between the on (i.e., conducting) portion of oscillator circuit 218 and the off (i.e., non-conducting) portion of oscillator circuit 218, which realizes near-instant or near-zero voltage switching of the primary-side power converter stage, thereby increasing efficiency by limiting the time duration in which both n-type transistors consume power and reducing or eliminating overshoots or undesired transients in the delivery of energy to the secondary-side power converter stage.

Class-D operation may cause a pseudo-differential signal on differential pair of nodes TX+ and TX− to have peak voltage levels (e.g., 15 V) up to, or slightly greater than, $3.2 \times V_{DD1}$. Such voltage levels are not tolerated by conventional CMOS devices (e.g., CMOS transistors that operate up to $1.2 \times V_{DD1}$). In at least one embodiment of oscillator circuit 218, cascode transistor 404 and cascode transistor 406 are laterally-diffused drain metal oxide semiconductor (LDMOS) transistors engineered for a high breakdown voltage. An exemplary LDMOS transistor can sustain high drain-to-source voltages (e.g., tens of Volts) while having low equivalent on-resistances ($R_{dson}$) in response to being driven into the linear mode of transistor operation. In at least one embodiment of oscillator circuit 218, transistor 404 and transistor 406 are 18 V LDMOS n-type transistors, which are available in an exemplary manufacturing process for mixed-signal integrated circuits (e.g., a bipolar-CMOS-DMOS manufacturing process). Other transistors used by oscillator circuit 218 (e.g., latch transistor 408 and latch transistor 410) are conventional 5 V CMOS devices that have a breakdown voltage that is just over the voltage level of input DC signal $V_{DD1}$ (e.g., a breakdown voltage in a range greater than 5 V, but less than 6 V). Cascode transistor 404 and cascode transistor 406 shield latch transistor 408 and latch transistor 410 from high voltages. The drain terminals of cascode transistor 404 and cascode transistor 406 support high drain-to-source voltage swings while maintaining corresponding gate-to-source voltages within reliability limits determined by the gate oxide thicknesses of the transistors (e.g., $V_{gs} < 6$ V).

For a voltage level of input DC signal $V_{DD1}$ equal to 5 V, drains of cascode transistor 404 and cascode transistor 406 will see voltages slightly higher than $3 \times V_{DD1} = 15$ V. Cascode transistor 404 and cascode transistor 406 enable fast restart of oscillation by presenting a sudden large voltage (e.g., a voltage above the latch crossover point, i.e., the point at which the gate-to-source voltage of latch transistor 410 equals the gate-to-source voltage of latch transistor 408) across latch transistor 408 and latch transistor 410. Voltages applied to latch transistor 408 and latch transistor 410 are precisely controlled so that those transistors enter the triode mode of operation and turn off at an appropriate time with little or no crossover time (i.e., the transition time when latch transistor 408 and latch transistor 410 are conducting in the active mode of transistor operation). Latch transistor 408 and latch transistor 410 each conduct during approximately one half of an oscillation period and does not conduct during the other half of the oscillation period. The capacitor of oscillator circuit 218 can be fully differential ($C_p$), single-ended ($C_{pa}$ and $C_{pb}$) or a combination of fully differential and single-ended ($C_p$, $C_{pa}$, and $C_{pb}$). Every 2C units of capacitance on each single-ended branch is equivalent to C fully differential units. The total equivalent capacitance seen by the oscillator circuit is $C_p+C_{p(a,b)}/2$.

Figure 4:
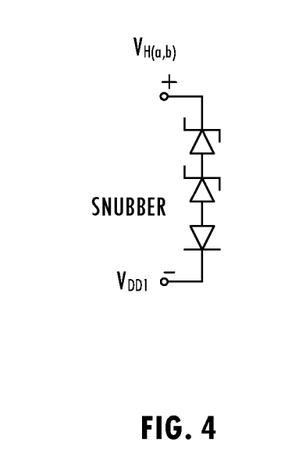
FIG. 4 illustrates a circuit diagram of an exemplary snubber circuit of FIG. 3.

Referring to FIGS. 3 and 4, an embodiment of oscillator circuit 218 includes snubber circuit 420 and snubber circuit 422 coupled to the drain terminal of cascode transistor 404 and the drain terminal of cascode transistor 406, respectively. Snubber circuit 420 and snubber circuit 422 prevent the voltage on the drain terminal of cascode transistor 404 and the voltage on the drain terminal of cascode transistor 406, respectively, from substantially exceeding $3 \times V_{DD1}$. As a result, snubber circuit 420 and snubber circuit 422 reduce or eliminate any non-fundamental modes of oscillation (i.e., modes of oscillation with an effective oscillation frequency other than $$f = \frac{1}{2\pi\sqrt{LC}})$$

and force clean, well-bounded oscillation of oscillator circuit 218. In addition, snubber circuit 420 and snubber circuit 422 return at least part of the excess energy to the power supply coupled to power supply node $V_{DD1}$. Snubber circuit 420 and snubber circuit 422 may be sized to have a clamping voltage level just above $3 \times V_{DD1}$. In at least one embodiment of oscillator circuit 218, snubber circuit 420 and snubber circuit 422 each include series-coupled, reverse-biased Zener diodes coupled in series with series-coupled, forward-biased diodes. Accordingly, the clamping voltage level equals $V_{DD1}+N_1 \times V_Z+N_2 \times V_F$, where $N_1$ and $N_2$ are integers greater than zero, $V_Z$ is a knee voltage of the Zener diodes, and $V_F$ is a forward voltage of the forward-biased diodes. However, this technique for determining the snubber clamping voltage level is particular to the narrow range of input DC signal $V_{DD1}$. However, in some applications, the voltage level of input DC signal $V_{DD1}$ varies over a wide range of input voltage levels and a fixed number of series-coupled Zener diodes that provide a clamping voltage level just above $3 \times V_{DD1}$ for a predetermined level of input DC signal $V_{DD1}$ provides a clamping voltage level that is insufficient for other voltage levels of input DC signal $V_{DD1}$. Accordingly, snubber 420 and snubber 422 are not suitable for applications having a wide input voltage range.

Figure 5:
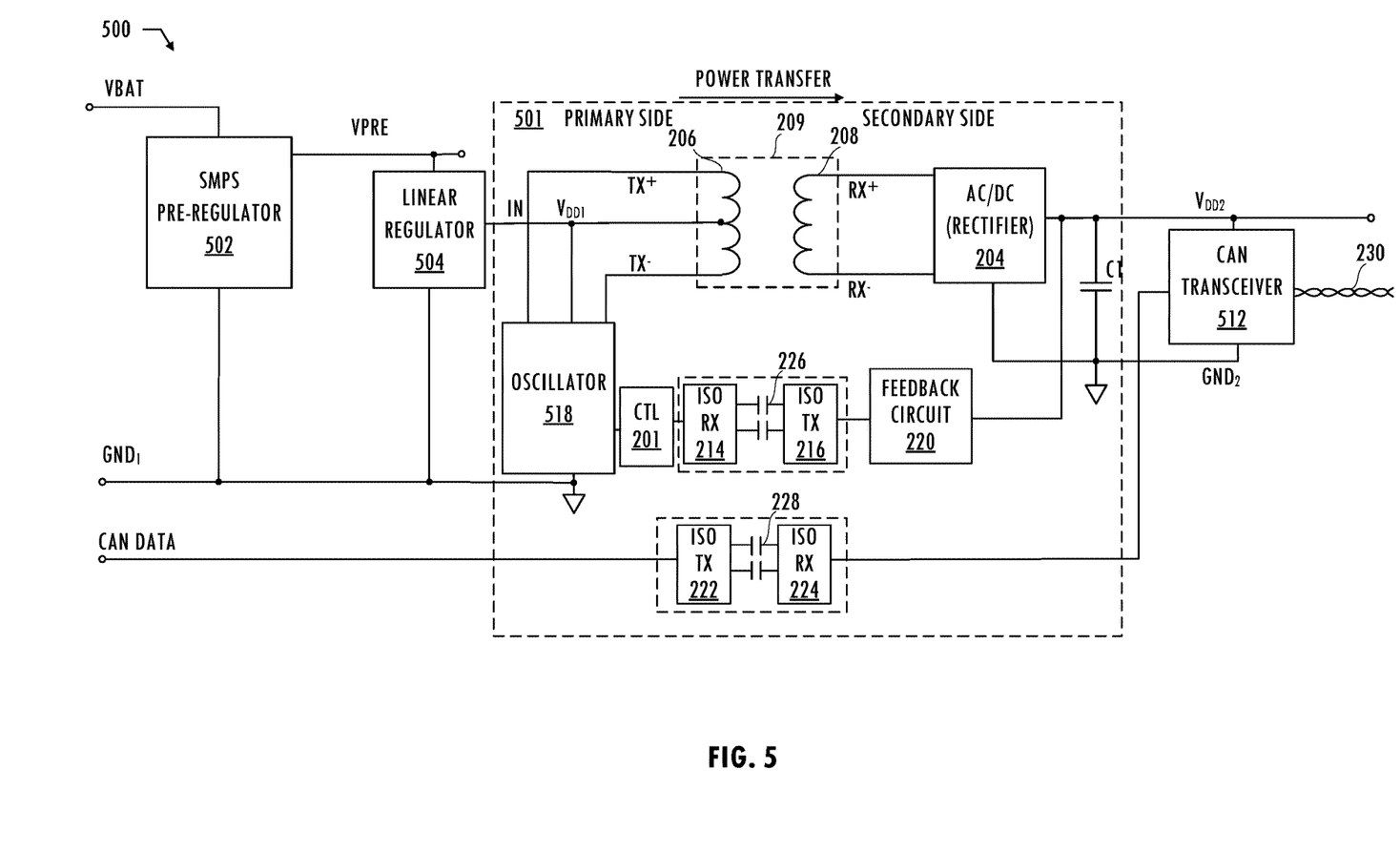
FIG. 5 illustrates a functional block diagram of a power transfer device compatible with a wide input voltage range in an exemplary automotive application consistent with at least one embodiment of the invention.

Referring to FIG. 5, an exemplary application having a wide input voltage range is an automotive power management system includes a car battery that typically provides battery voltage $V_{BAT}$ of 12 V, but battery voltage $V_{BAT}$ varies from 40V to 4V under some conditions. Automotive power management system 500 typically uses pre-regulator 502 to reduce battery voltage $V_{BAT}$ to a more manageable voltage followed by linear regulator 504 that generates input DC voltage $V_{DD1}$ (e.g., 5V) that powers a load system, e.g., controller area network transceiver 512, which receives controller area network data from the primary side of automotive power management system 500 via transmitter 222 and receiver 224. Transmitter 222 implements digital modulation of the controller area network data transmitted across the capacitive channel 228 and received and demodulated by receiver 224. In a crank condition, the car battery provides battery voltage $V_{BAT}$ of only 4 V and when pre-regulator 502 detects that battery voltage $V_{BAT}$ is 4 V, pre-regulator 502 passes battery voltage $V_{BAT}$ to linear regulator 504. In addition, linear regulator 504 also passes battery voltage $V_{BAT}$ (e.g., in a dropout condition) to power transfer device 501 to allow as much of battery voltage $V_{BAT}$ through as possible as input DC voltage $V_{DD1}$. To handle the wide range of battery voltage $V_{BAT}$, power transfer device 501 supports a wide input voltage range. An exemplary controller area network bus application operates with a power supply voltage level $V_{DD2}$ of 3.3 V and power transfer device 501 provides that 3.3 V power supply voltage level in response to an input DC voltage $V_{DD1}$ from linear regulator 504. Power transfer device 501 converts the input DC voltage $V_{DD1}$, which is provided by linear regulator 504, to a second voltage level $V_{DD2}$ usable by controller area network transceiver 512, which is coupled to controller area network transmission line 230.

Figure 6:
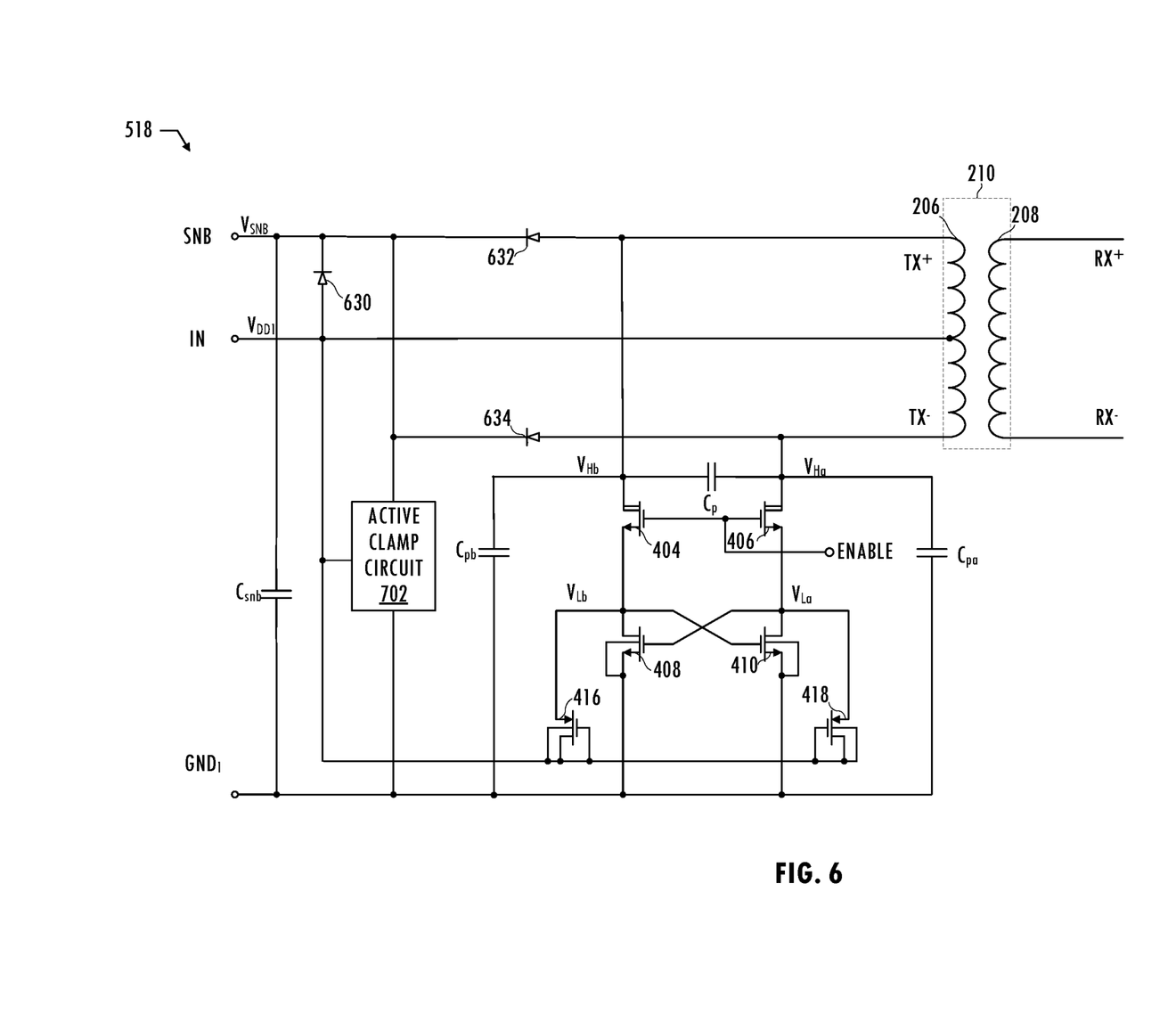
FIG. 6 illustrates a circuit diagram of an exemplary oscillator circuit of the power transfer device of FIG. 5 consistent with at least one embodiment of the invention.
Figure 7:
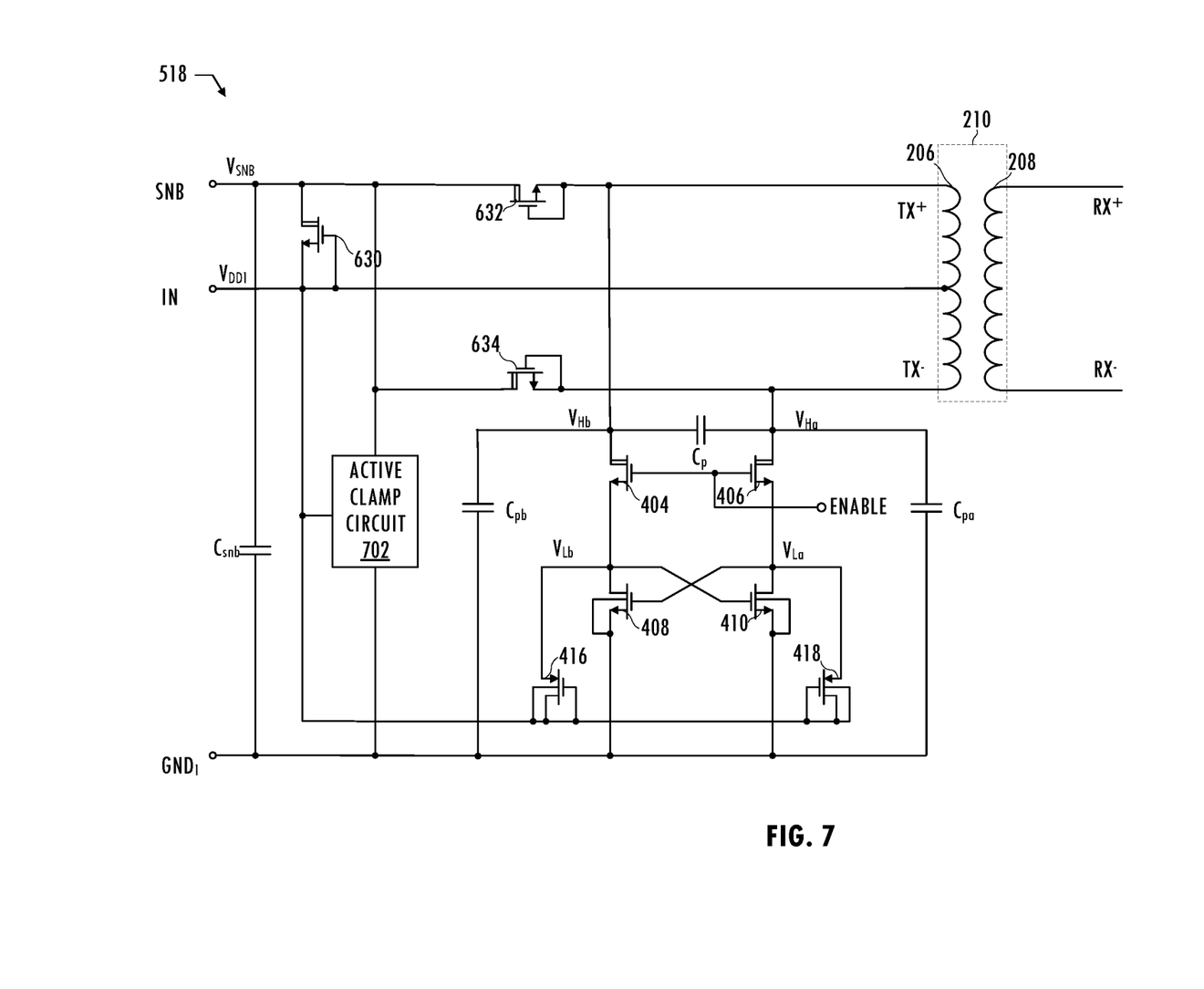
FIG. 7 illustrates a circuit diagram of an exemplary oscillator circuit of a power transfer device of FIG. 5 including transistors having different device characteristics consistent with at least one embodiment of the invention.

Power transfer device 501 includes oscillator circuit 518, which tolerates large voltage swings on the input power supply node IN. Referring to FIG. 6, oscillator circuit 518 includes the latch circuit formed by latch transistor 408 and latch transistor 410, and cascode transistor 404 and cascode transistor 406, described above with reference to FIG. 3. Referring to FIGS. 6 and 7, in at least one embodiment, oscillator circuit 518 includes clamp transistor 416 and clamp transistor 418 having source terminals coupled to the gate terminal of latch transistor 410 and the gate terminal of latch transistor 408, respectively. Clamp transistor 416 and clamp transistor 418 each include a bulk terminal, a gate terminal, and a drain terminal that are coupled to the power supply node IN providing input DC signal $V_{DD1}$. Note that clamp transistor 416 and clamp transistor 418 are p-type transistors that have their n-type bulk terminal coupled to a corresponding drain node and not to a corresponding source node (i.e., a higher voltage node), as in typical clamp transistor configurations. The configuration of clamp transistor 416 and clamp transistor 418 results in two conduction paths for each clamp transistor: a channel conduction path and a body diode conduction path. Two conduction paths for each clamp transistor makes this configuration faster than the typical clamp transistor configuration. Clamp transistor 416 and clamp transistor 418 limit the voltages of node $V_{La}$ and node $V_{Lb}$. If the voltages on node $V_{La}$ or node $V_{Lb}$ exceeds $V_{DD1}$, then both the channel diode and the body diode of clamp transistor 416 and clamp transistor 418 start conducting, thereby clamping the gate voltages of latch transistor 410 and latch transistor 408. Clamp transistor 416 and clamp transistor 418 are configured to return part of the clamped energy back to power supply node IN, thereby increasing the efficiency of oscillator circuit 518. Various embodiments of circuits compatible with oscillator circuit 518 are described in U.S. patent application Ser. No. 15/835,230, entitled "Power Transfer Device Using an Oscillator," naming Mohammad Al-Shyoukh et al. as inventors, filed Dec. 7, 2017, U.S. patent application Ser. No. 15/835,234, entitled "Isolated Power Transfer with Integrated Transformer and Voltage Control," naming Krishna Pentakota et al. as inventors, filed Dec. 7, 2017, and U.S. patent application Ser. No. 15/940,551, entitled "Electromagnetic Radiation Control for Isolated Power Transfer Product," naming Krishna Pentakota et al. as inventors, filed Mar. 29, 2018, which applications are incorporated by reference herein.

Oscillator circuit 518 includes active clamp circuit 702, which is an active shunt regulator circuit. Active clamp circuit 702 includes a diode-OR implemented by diode 632 and diode 634, which are typically off, or near-off, during steady-state operation of oscillator circuit 518 (i.e., oscillator circuit 518 is outputting an oscillating signal). The diode-OR provides the higher of the two voltage signals on differential pair of nodes TX+ and TX− to regulated power supply node SNB, which delivers charge to capacitor $C_{SNB}$. Capacitor $C_{SNB}$ is external to an integrated circuit including transistors of oscillator circuit 518 since capacitor $C_{SNB}$ has a capacitance that is outside the range of integrated circuit capacitors (e.g., capacitor $C_{SNB}$ is one to two orders of magnitude greater than a typical integrated circuit capacitance). Diode 630 pre-charges power supply node SNB to a pre-charge voltage of $V_{DD1}$–$V_F$, where $V_F$ is the forward voltage of forward-biased diode 630. At startup, regulated power supply node SNB has a pre-charge voltage of $V_{SNB}=V_{DD1}-V_F$, which is less than $3\times V_{DD1}$, but ramps up to a steady-state voltage level of $3\times V_{DD1}$. If voltage $V_{SNB}$ on regulated power supply node SNB exceeds $3\times V_{DD1}$, active clamp circuit 702 shunts excess current away from regulated power supply node SNB. In at least one embodiment of oscillator circuit 518, diode 630, diode 632, and diode 634 are each implemented using the high-side body diode of a corresponding LDMOS transistor. Unlike a conventional CMOS diode coupled transistor that has a gate-to-drain voltage equal to 0 V, the gate-to-source voltage of each of those LDMOS transistors is 0 V, ensuring no channel conduction.

Figure 8:
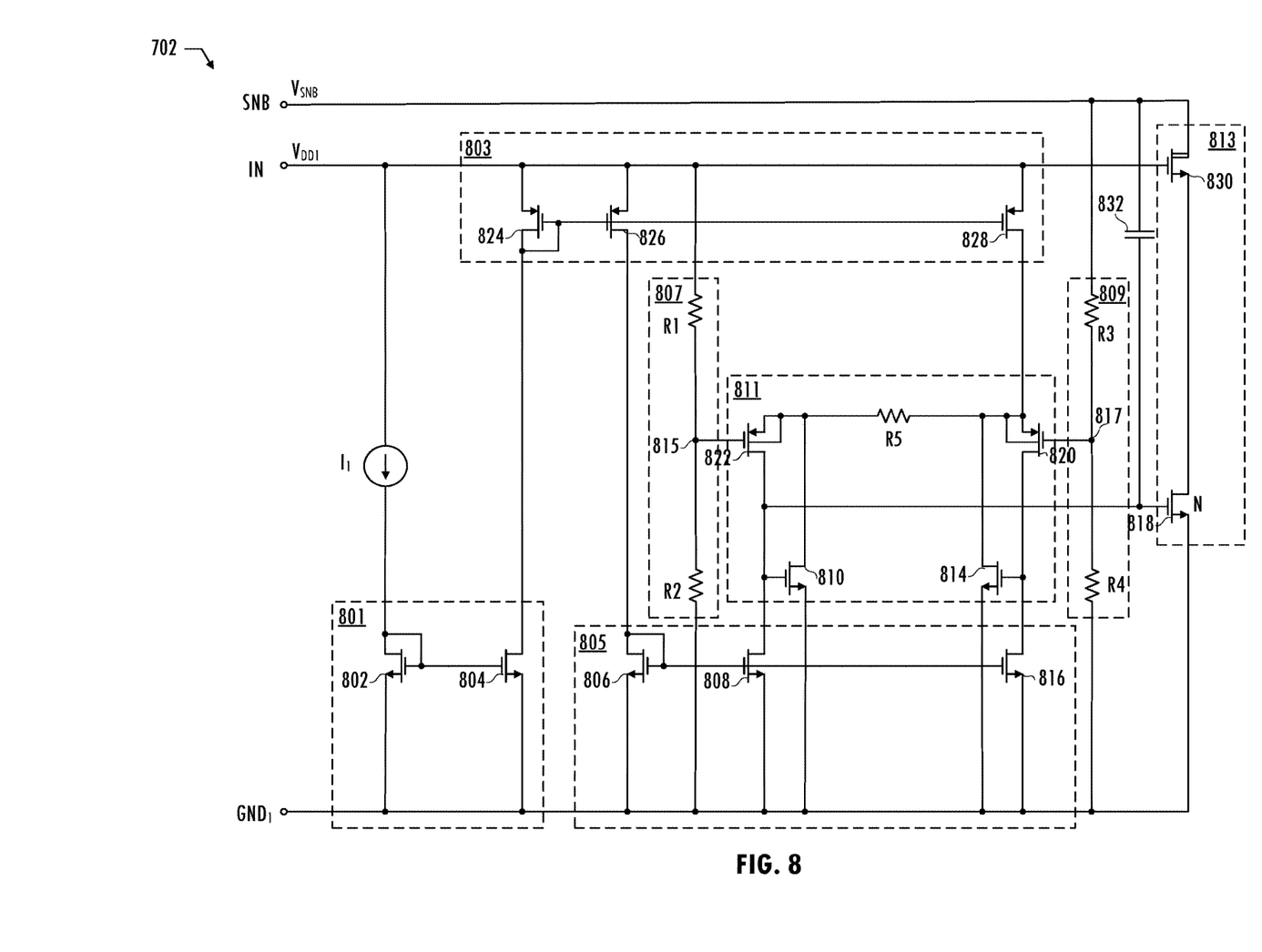
FIG. 8 illustrates a circuit diagram of an exemplary active clamp circuit of the oscillator circuit of FIGS. 6 and 7 consistent with at least one embodiment of the invention.

Referring to FIG. 8, an exemplary embodiment of active clamp circuit 702 includes current source I1, which is coupled to current mirror 801. Current mirror 801, which includes transistor 802 and transistor 804, establishes a stable current in current mirror 803, which includes transistor 824, transistor 826, and transistor 828. Current mirror 803 establishes a stable current in current mirror 805, which includes transistor 806, transistor 808, and transistor 816. Current mirror 803 and current mirror 805 provide bias currents to gain-boosted transconductance stage 811. Voltage divider 807 senses input DC signal $V_{DD1}$ and controls gain-boosted transconductance stage 811 according to a measured voltage level of input DC signal $V_{DD1}$. Voltage divider 809 senses regulated power supply node SNB and controls gain-boosted transconductance stage 811 according to a measured voltage level of regulated voltage $V_{SNB}$. In at least one embodiment of active clamp circuit 702, resistor R1 and resistor R2 of voltage divider 807 and resistor R4 of voltage divider 809 each have resistance R (i.e., R1=R2=R3=R). Resistor R4 of voltage divider 809 has a resistance that is k×R, where k is the ratio of the resistance of resistor R3 to resistance R, which is a number greater than 1. Accordingly, voltage $V_{SNB}$ on regulated power supply node SNB is linearly related to the input DC voltage $V_{DD1}$. For those embodiments where R1=R2=R3=R, and R4=k×R, a value for k may be determined based on the following relationship at the regulation point (i.e., at the point where inputs to gate of transistor 820 equals the input to the gate of transistor 822):

$$V_{DD1}\left(\frac{R}{R+R}\right) = V_{SNB}\left(\frac{R}{R+kR}\right),$$

which can be represented as $$\frac{1}{2}k + \frac{1}{2} = \frac{V_{SNB}}{V_{DD1}}.$$

If a target ratio of $$\frac{V_{SNB}}{V_{DD1}} = 3.2,$$

then k is 5.4. Note that the target ratio of $$\frac{V_{SNB}}{V_{DD1}}$$

may vary with the target application and other embodiments may use different relationships between resistances.

The current that is conducted by transistor 810 and transistor 814 generates the current that flows through cascoded power stage 813. Cascoded power stage 813 multiplies the current of gain-boosted transconductance stage 811 by N, where N is the size of transistor 818 with respect to the size of transistor 810 and 814. Capacitor 832 is a feedforward capacitor that improves the dynamic response of active clamp circuit 702 and provides frequency compensation that improves stability of active clamp circuit 702. In at least one embodiment, N is set to an integer for ease of realization in an integrated circuit design. In a typical application, 100≤N≤300. The value of N defines a maximum current that cascaded power stage 813 can handle as approximately N times the current flowing through transistor 828.

Gain-boosted transconductance stage 811 has a transconductance defined by 1/R5. When the voltage on regulated power supply node SNB is less than $V_{DD1}\times(1+k)/2$, transistor 810 is off (i.e., no current flows through transistor 810) and no current flows through cascoded power stage 813. As the voltage on node SNB exceeds $V_{DD1}\times(1+k)/2$, error voltage $V_{err}$ across node 815 and node 817 increases and the portion of gain-boosted transconductance stage 811 including transistor 822 and transistor 810 begins to dominate the portion of gain-boosted transconductance stage 811 including transistor 820 and transistor 814, and most of the tail current (i.e., the current through transistor 828) flows through the half of gain-boosted transconductance stage 811 including transistor 822 and transistor 810. For large error voltages, the amount of current that flows through transistor 810 is defined by 1/R5, and is approximately $V_{err}/R5$. That current is multiplied by N via transistor 818. Therefore, the current through transistor 818 is approximately $(V_{err}/R5)\times N$. As the error voltage across node 815 and node 817 increases, the current that flows through transistor 830 and transistor 818 increases, thereby clamping the voltage on node SNB. In at least one embodiment of active clamp 702, transistor 818 is a power transistor having a breakdown voltage compatible with a 5 V power supply and transistor 830 is an LDMOS transistor that shields transistor 818 from high voltages.

Referring to FIGS. 5-8, power transfer device 501, generates output voltage $V_{DD2}$ that rises to its final level upon startup and is hysteretically regulated using feedback circuit 220. Oscillator circuit 518 gradually drains the high voltages of $V_{Ha}$ and $V_{Hb}$ on the differential pair of nodes TX+ and TX− to their final voltage levels of approximately $3\times V_{DD1}$. Clamp voltage $V_{SNB}$ gradually rises to its final voltage level of $3\times V_{DD1}$ and active clamp circuit 702 maintains that voltage level after feedback circuit 220 begins hysteretic regulation of oscillator circuit 518. During startup (i.e., during the charging interval of active clamp circuit 702), the frequency of oscillation of conductive coil 206 and oscillator circuit 518 deviates from the ideal frequency of $$1 \Big/ \frac{1}{2\pi\sqrt{LC}}$$

since conductive coil 206 transfers energy to charge capacitor $C_{SNB}$ via diode 632 and diode 634. However, such frequency deviation is acceptable in some applications because the clamp charging interval is relatively fast (e.g., microseconds) and capacitor $C_{SNB}$ will be fully-charged before $V_{DD2}$ reaches its final value.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Thus, a power transfer device having a wide input voltage range has been described. The description of the invention set forth herein is illustrative and is not intended to limit the scope of the invention as set forth in the following claims. For example, while the invention has been described in embodiments of a power transfer device in an automotive application, techniques described herein may be combined with circuits of other power transfer applications having a wide input voltage range. Variations and modifications of the embodiments disclosed herein, may be made based on the description set forth herein, without departing from the scope of the invention as set forth in the following claims.

What is claimed is:

1. A power transfer device comprising:
a first power supply node;
a second power supply node; and
an oscillator circuit configured to convert an input DC signal across the first power supply node and the second power supply node into an AC signal on a differential pair of nodes comprising a first node and a second node in response to a control signal, the oscillator circuit comprising:
a regulated power supply node; and
an active shunt regulator circuit configured to clamp a peak voltage level across the regulated power supply node and the second power supply node to a clamped voltage level, the clamped voltage level being linearly related to a first voltage level on the first power supply node.

2. The power transfer device, as recited in claim 1, wherein the active shunt regulator circuit comprises:
a diode-OR coupled to the regulated power supply node, the first node, and the second node.

3. The power transfer device, as recited in claim 2, wherein the diode-OR comprises at least one diode-coupled laterally-diffused drain metal oxide semiconductor (LDMOS) transistor and the active shunt regulator circuit further comprises at least one regular transistor.

4. The power transfer device, as recited in claim 1, further comprising:
wherein the active shunt regulator circuit comprises:
a first terminal coupled to the regulated power supply node;
a second terminal coupled to the second power supply node; and
a capacitor coupled to the first terminal and the second terminal, the capacitor being external to an integrated circuit die including other portions of the active shunt regulator circuit and configured to smooth a voltage signal across the regulated power supply node and second power supply node.

5. The power transfer device, as recited in claim 1, wherein the active shunt regulator circuit is configured to limit a voltage level across the regulated power supply node and the second power supply node to $k \times V_{DD}$, where k is a number greater than two.

6. The power transfer device, as recited in claim 1, wherein the active shunt regulator circuit comprises:
a first voltage divider circuit coupled to the first power supply node and the second power supply node;
a second voltage divider circuit coupled to the regulated power supply node and the second power supply node;
a gain-boosted transconductance circuit coupled to a first output of the first voltage divider circuit and a second output of the second voltage divider circuit; and
an output circuit coupled to the regulated power supply node, the first power supply node, and the second power supply node, and an output of the gain-boosted transconductance circuit, the output circuit being configured to sink current from the regulated power supply node to the second power supply node in response to a voltage on the regulated power supply node exceeding $(1+k)/2$ times the first voltage level, where k is a ratio of a first resistance of the first voltage divider circuit to a second resistance of the first voltage divider circuit.

7. The power transfer device, as recited in claim 6, wherein the active shunt regulator circuit further comprises:
a degenerated differential pair of transistors coupled to the first voltage divider circuit and the second voltage divider circuit.

8. The power transfer device, as recited in claim 6, wherein the output circuit comprises a laterally-diffused drain metal oxide semiconductor (LDMOS) transistor coupled to the regulated power supply node and the first power supply node and a regular transistor.

9. The power transfer device, as recited in claim 6, wherein the active shunt regulator circuit further comprises:
a current source coupled to the first power supply node;
a first current mirror coupled to the current source and the second power supply node;
a second current mirror coupled to the first current mirror, the first power supply node, and the gain-boosted transconductance circuit; and
a third current mirror coupled to the second current mirror, the second power supply node, and the gain-boosted transconductance circuit.

10. The power transfer device, as recited in claim 1, wherein the active shunt regulator circuit comprises:
a pre-charge circuit configured to pre-charge the regulated power supply node to a pre-charge voltage level, the pre-charge voltage level being $V_{DD}-V_F$, where $V_{DD}$ is an input DC voltage across the first power supply node and the second power supply node and $V_F$ is a forward voltage of a forward-biased diode coupled between the regulated power supply node and the first power supply node.

11. The power transfer device, as recited in claim 1, wherein the oscillator circuit further comprises a first conductive coil coupled to the first node and the second node to form a primary side circuit of the power transfer device, a center tap of the first conductive coil being coupled to the first power supply node, and wherein the oscillator circuit is configured to develop a pseudo-differential signal on the first node and the second node, the pseudo-differential signal having a peak voltage of at least three times a voltage level of an input DC voltage on the first power supply node.

12. A method comprising:

converting an input DC signal received using a first power supply node and a second power supply node into an AC signal using an oscillator circuit, wherein the converting comprises an active shunt regulator clamping a peak voltage level across a regulated power supply node and the second power supply node to a clamped voltage level, the clamped voltage level being linearly related to a first voltage level of the input DC signal.

13. The method, as recited in claim 12, further comprising:

pre-charging the regulated power supply node to a pre-charge voltage level, the pre-charge voltage level being less than the first voltage level; and charging the regulated power supply node from the pre-charge voltage level to the clamped voltage level.

14. The method, as recited in claim 13, wherein the pre-charge voltage level is $V_{DD}-V_F$, where $V_{DD}$ is the first voltage level and $V_F$ is a forward voltage of a forward-biased diode coupled between the regulated power supply node and the first power supply node.

15. The method, as recited in claim 12, wherein the converting further comprises:

developing a pseudo-differential signal on a differential pair of nodes including a first node of the oscillator circuit and a second node of the oscillator circuit, wherein the clamping limits a second peak voltage level of the AC signal to the clamped voltage level.

16. The method, as recited in claim 15, further comprising:

providing to the regulated power supply node, a higher voltage signal of a first signal on the first node and a second signal on the second node.

17. The method, as recited in claim 12, wherein the clamping comprises:

measuring the first voltage level across the first power supply node and the second power supply node to generate a first voltage measurement; and measuring a second voltage level across the regulated power supply node and the second power supply node to generate a second voltage measurement.

18. The method, as recited in claim 17, wherein the clamping comprises:

shunting current from the regulated power supply node to the second power supply node in response to the first voltage measurement exceeding $(1+k)/2$ times the second voltage measurement, where k is a ratio of a first resistance of a voltage-divider circuit used to generate the first voltage measurement to a second resistance of the voltage-divider circuit.

19. A power transfer device comprising:

a first power supply node;

a second power supply node; and a power amplifier comprising:

a regulated power supply node;

an oscillator circuit comprising:

a differential pair of nodes comprising a first node and a second node;

first transistors having a first conductivity type and a first breakdown voltage coupled to the first node and the second node; and second transistors having the first conductivity type and a second breakdown voltage, the second transistors being coupled to the first transistors; and an active shunt regulator circuit configured to clamp a peak voltage level across the regulated power supply node and the second power supply node to a clamped voltage level, the active shunt regulator circuit comprising:

a first transistor having the first conductivity type and the first breakdown voltage, the first transistor being coupled to the regulated power supply node and the first power supply node; and at least one second transistor having the second breakdown voltage, the at least one second transistor being coupled between the first power supply node and the second power supply node; and wherein the first breakdown voltage is greater than the second breakdown voltage.

20. The power transfer device, as recited in claim 19, wherein the active shunt regulator circuit further comprises:

a diode-OR comprising:

a first diode-coupled transistor having the first conductivity type and the first breakdown voltage, the first diode-coupled transistor being coupled between the regulated power supply node and the first node; and a second diode-coupled transistor having the first conductivity type and the first breakdown voltage, the second diode-coupled transistor being coupled between the regulated power supply node and the second node; and a pre-charge circuit comprising a third diode-coupled transistor having the first conductivity type and the first breakdown voltage, the second diode-coupled transistor being coupled between the regulated power supply node and the first power supply node.

* * * * *